Patented Nov. 7, 1950

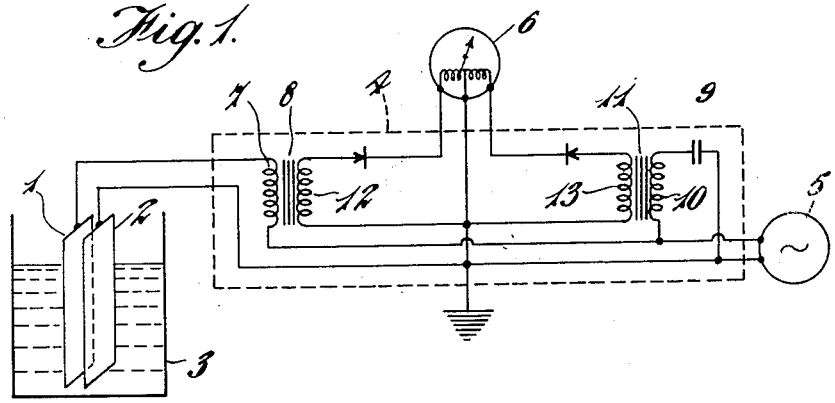
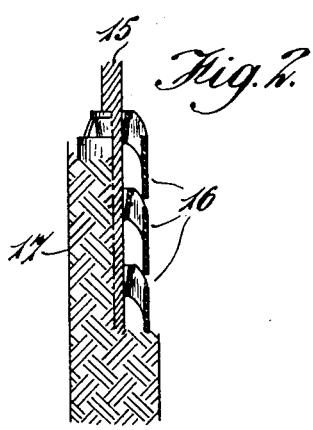
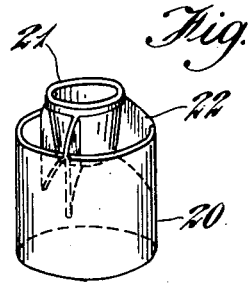
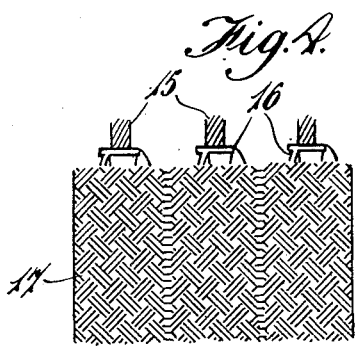
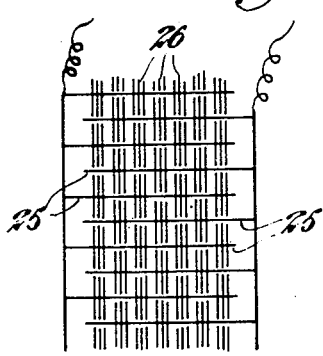

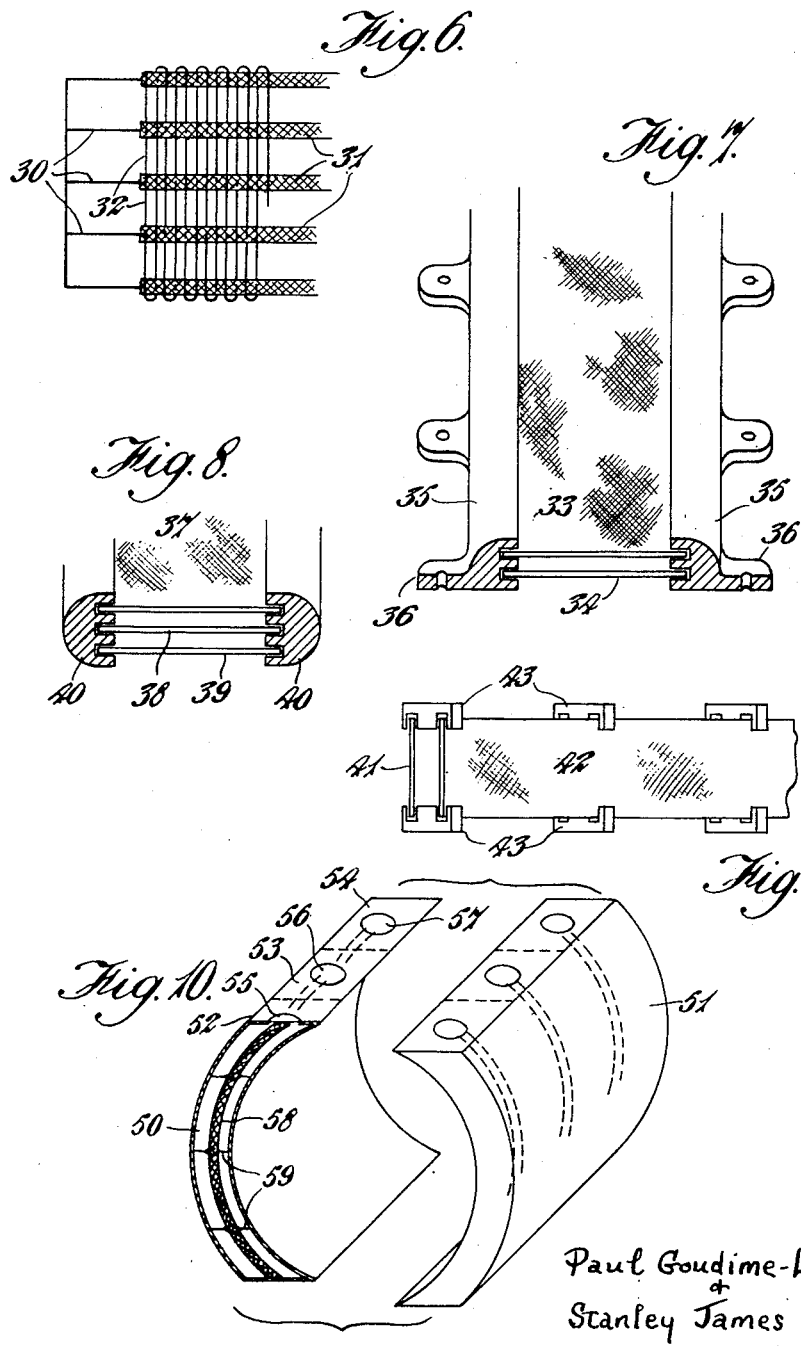

2,529,015

UNITED STATES PATENT OFFICE 2,529,015

LIQUID CONTENTS GAUGE

Paul Goudime-Levkovitsch, Chertsey, and Stanley James Smith, London, England, assignors to West Road Co. Limited Application January 22, 1946, Serial No. 642,714
In Great Britain February 7, 1945

2 Claims. (Cl. 175—41.5)

This invention relates to liquid contents gauges of the kind described in United States Patent No. 2,377,275. Such gauges employ an electrical method of measuring the liquid contents of fuel tanks and the like wherein the liquid is used as a dielectric to control the capacity of a condenser arranged within the container, which capacity is measured and indicated continuously in terms of liquid level.

The condenser as described in the above-mentioned patent consists of two concentric tubes between which the liquid may enter. This form of rigid measuring condenser is however unsuitable for use in some types of fuel container, particularly those of complex shape such as are used in some aircraft at the present time.

It is accordingly an object of the present invention to provide a liquid contents gauge of the type described embodying an improved form of measuring condenser.

A further object of the present invention is to provide a measuring condenser which is flexible so that it may be bent to any desired shape.

Other objects and advantages of the present invention will become apparent during the course of the following description with reference to the drawings wherein—

Fig. 1 shows diagrammatically the electrical circuit of one form of a liquid contents gauge of the kind described.

Fig. 2 shows partly in section one form of a flexible measuring condenser,

Fig. 3 shows a perspective view of a spacing thimble as used in the condenser of Fig. 2, Fig. 4 shows a flexible condenser made up of a plurality of the condensers of Fig. 2;

Fig. 5 shows diagrammatically another form of flexible condenser;

Fig. 6 shows diagrammatically a further form of flexible condenser;

Figs. 7, 8 and 9 show still further forms of flexible condensers, and

Fig. 10 shows a particular type of fuel container having condensers of the kind shown in Fig. 2 installed therein.

Referring now to Fig. 1 wherein is shown diagrammatically the electrical circuit of a liquid contents gauge of the kind described in the aforementioned United States Patent No. 2,377,275, the measuring condenser comprises essentially two electrodes 1 and 2 arranged vertically in a liquid container 3 and spaced apart somewhat so that the liquid can penetrate between them. The electrical capacity between these electrodes, which varies according to the height of the liquid in the container, is measured by the rectifier unit 4 in conjunction with a source of alternating current 5, and is indicated in terms of liquid level by the ratiometer 6. Current from the source 5 which may have a frequency of some 20,000 C. P. S., is applied to two parallel connected paths comprising measuring condenser 1, 2, and the primary winding 7 of the transformer 8 in series, and the relatively fixed condenser 9 and the primary winding 10 of transformer 11 also in series. The output from each of the secondary windings 12 and 13 of the transformers 8 and 11 is rectified and applied each to a separate coil of the two coil ratiometer 6. The ratio of the capacities of the measuring condenser 1, 2 and the relatively fixed condenser 9 will thus be indicated and since the capacity of the condenser 9 is adjusted to a suitable value and maintained constant the reading of the ratiometer 6 will be proportional to the capacity of the measuring condenser 1, 2, and hence to the height of the liquid in the container 3. Variations of voltage or frequency of the source 5 will have little effect on the accuracy of reading.

Other methods of measuring the capacity of the measuring condenser 1, 2, may be used and the present invention is not to be restricted to the use of the particular method described.

The measuring condenser described in United States Patent No. 2,377,275 consists of two concentric metal tubes and while this arrangement is satisfactory for some types of fuel container it cannot be used with many types of container of the kind now being used on aircraft. In particular it is not suitable for containers which are constructed in the form of a flexible bag which on installation has to be folded up and inserted in position through a relatively small hole. This type of rigid measuring condenser is also not suitable for use with rigid tanks of complex shape, it being remembered that the condenser must extend throughout the tank from the highest to the lowest level.

In many cases the measuring condenser has to be fitted to a fuel tank after the tank has been constructed and it is then not possible to build the condenser into the structure of the tank during assembly as is suggested in the patent above mentioned. Additional complications occur when a complex distribution of capacity in the container is required in order to obtain a true indication of volume at all positions of the container.

In accordance with the present invention the measuring condenser is made flexible so that it can if necessary be folded up or bent to follow any desired path such as the curved side wall of a container.

Such a condenser which may be of small dimensions in cross section may be readily inserted into a container through a small hole in the surface thereof and being light in weight requires little support within the container. This form of condenser may be secured to the side walls of a container or may be fixed only at the top and bottom of the container hanging freely between these points.

One form of flexible measuring condenser according to this invention is shown in Fig. 2. This condenser consists of a cable comprising a twisted central conductor 15 of which are threaded spacing thimbles 16 nesting one on the other, the whole being covered by an outer metal braiding 17 of fairly open mesh. The thimbles 16 one of which is shown in Fig. 3 are formed of a low loss plastic material which is not softened by petrol or fuels of similar type. It comprises a cylindrical skirt portion 20, and a short tubular centre portion 21 secured to the end of the skirt portion by three ribs 22. The outer surface of these ribs are profiled so that they lie on a substantially hemispherical surface and form with the lower end of the skirt 20 of the next thimble a ball and socket joint. The central conductor is formed of a plurality of relatively thin wires twisting together in the known way while the outer braiding is also formed of thin wires braided in any suitable manner but with a somewhat open mesh so that liquid may flow therethrough.

In some applications a measuring condenser of greater capacity may be required and accordingly a number of condensers of the kind shown in Fig. 2 may be arranged side by side. For example as indicated diagrammatically in Fig. 4 three assemblies of central conductor 15 and thimbles 16 may be arranged side by side with an over all braiding 17 woven round the thimbles to form a flat mat.

In the design of this form of measuring condenser it is important to arrange that as the liquid level in the container falls the liquid also drains out of the condenser. This is achieved in this form of the condenser by the particular design of the thimbles illustrated which present no cavities or enclosed spaces where liquid may be trapped.

Another form of measuring condenser in accordance with this invention is illustrated diagrammatically in Fig. 5. In this arrangement a plurality of flexible conductors 25 are laid flat to form a warp and a weft 26 of suitable insulating material is woven round them to hold them firmly spaced. Alternate conductors are connected together to form two groups, insulated from one another, constituting the two electrodes of the condenser. This form of condenser is constructed as a flexible mat or strip which may be of unlimited length and cut to size for each particular application.

A further form of the strip or mat type of measuring condenser is illustrated diagrammatically in Fig. 6. In this form a plurality of flexible conductors 30 are laid flat and each conductor is surrounded with a permeable sleeve 31 formed of glass fibre or the like over which is woven a weft 32 of conductive material such as fine copper wire. The conductors 30 connected in parallel form one electrode of the measuring condenser while the weft forms the other. To avoid obtaining too high a capacity in this form of the condenser, the weft is preferably of somewhat open mesh. Alternatively the weft may consist principally of insulating fibres with a few spaced fine conducting wires. Alternatively the conductors 31 may be coated with insulating material or have threaded thereon insulating beads or the like whereby they are separated from the conductive part of the weft.

Still further forms of flexible measuring condensers in accordance with this invention are shown in Figs. 7, 8 and 9. In Fig. 7 two strips of thin conductive material 33 and 34, of which at least the outer 33 is formed of gauze or wire mesh or the like, are secured and spaced by grooved rods 35 of insulating material, e. g. a thermoplastic material such as poly-vinyl chloride. The rods are formed with spaced lugs 36 by which they may be secured to the walls of a container. In Fig. 8 three conductive strips 37, 38 and 39, all formed preferably of gauze or the like, are secured and spaced by the grooved rods 40. In this form of condenser the two outer conducting strips 37 and 39 are connected together electrically to form one electrode of the condenser while the central strip 38 forms the other. In Fig. 9 two conductive strips 41 and 42 are held separate by slotted bars 43 secured to the strip at spaced points. In these three forms of condenser the rods 35 and 40 and the bars 43 are conveniently formed of a thermoplastic material so that by localised heating the conductive strips may be locked thereto, for example holes may be formed in the strips at spaced points along their edges and opposite faces of the grooves in the plastic material caused to fuse together through these holes.

In all the various forms of flexible condenser described there are two conductive elements insulated from one another which constitute the two electrodes 1 and 2 of the measuring condenser of Fig. 1. In some cases it is permissible to ground one of these electrodes to the structure of the container.

In order to deal with a variety of containers it is desirable that the measuring condenser should be available in types having different capacities per unit length. In the form of condenser shown in Fig. 2 this may be achieved by providing central conductors of different diameter. In practice a range of four sizes of conductor has been found adequate. In the case of the condensers of Figs. 5 and 6 a wide range can be obtained by weaving the flexible strip or mat in a number of different widths, while in the case of the condensers of Figs. 7–9 the width or the spacing of the strips may be varied as required.

One factor in the design of these condensers is that owing to the low inertia of liquid level indicators of the kind described any agitation of the liquid such as occurs in aircraft during flight will produce wild fluctuations of the indicator pointer. It is accordingly desirable to provide some damping of the liquid round the electrodes of the condenser. In the form of condenser shown in Fig. 2 this is readily achieved by selecting the mesh of the outer braiding 17 to restrict the rate of liquid flow therethrough. In practice a very satisfactory control may be obtained in this manner. In the forms of condenser illustrated in Figs. 5 and 6 this control may be achieved to some extent by the thickness of the weaving but this may at the same time prevent the liquid from flowing away from the electrodes freely as the liquid level in the container falls. Suitable electrical damping of the indicating instrument may however usually be provided in this case.

In the case of the condenser of Fig. 7 adequate damping may be obtained by forming the outer conductive strip 33 of a gauze or other permeable conductive material when the condenser is secured to the wall of a container. The condenser of Fig. 8 is suitable for use unsupported and provides full damping by the use of two gauze or the like strips 37 and 39 enclosing the central conductive strip 38.

One example of the installation of a measuring condenser in accordance with this invention is shown in Fig. 10. There is here shown two fuel tanks 50 and 51 which are of curved form to enclose a cylindrical space of, in a particular example, some 9' diameter. As shown each tank is divided into 3 cells, 52, 53 and 54 and each cell is provided with a header box 55, 56 and 57. A cable 58 of the kind shown in Fig. 2 extends from each box to the bottom of the cell and it is held approximately in the centre of the cell by stays 59.

A further example of the use of measuring condensers in accordance with this invention occurs in connexion with fuel containers of the flexible bag type. These containers which are used in aircraft are formed of flexible material and are entirely sealed except for in-flow and out-flow connexions. They are shaped to fill cells formed in the structure of the aircraft and form when filled with fuel an impervious lining for such cells. The wing of an aircraft may have twelve or more such cells each containing such a flexible bag. Installation is normally effected by folding the bag until it has dimensions small enough to pass through a relatively small aperture in the outer surface of the wing or other part of the aircraft. On being filled with fuel the bag will take up the shape of its enclosing cell and is stiff enough to retain this shape when the fuel is withdrawn. Prior to installation each of the bags is provided with a measuring condenser shown in Fig. 2 being preferably arranged to hang between the top and bottom of the bag while those forms of condenser shown in Figs. 5 and 6 are preferably secured to one or both of the side walls of the bag. In either case the condensers are sufficiently flexible to be folded with the bag on installation without damage to themselves and, when the bag has been inflated within its cell, are present in their proper positions for accurate measurement of the liquid contents of the bag. It may be observed here that there is no other type of level gauge at present known that can be applied on aircraft to such fuel containers.

It will be appreciated that these two examples which are given by way of illustration only do not exhaust all the possible applications of the flexible condensers in accordance with this invention as there are many other cases where it is more convenient to install a flexible rather than a rigid condenser in a fuel container.

We claim:

1. A measuring condenser for use in a liquid contents gauge for continuous indication of the level of liquid in a container, the liquid serving as the condenser dielectric, said condenser comprising a pair of elongated, laterally flexible conductors, one of said conductors being tubular and embracing the other of said conductors, and insulating thimbles lying between and connecting said conductors in predetermined spaced relation, each thimble having within its structure and intermediate the conductors a plurality of openings affording free flow of liquid lengthwise of and between said conductors, and being formed to provide cooperating ball and socket joints between adjacent thimbles, whereby said condenser in its entirety may flex laterally to conform to the contour of the container in which it is introduced.

2. A measuring condenser for use in a liquid contents gauge for continuous indication of the level of liquid in a container, the liquid serving as the condenser dielectric, said condenser comprising a pair of elongated, laterally flexible conductors, one of said conductors being tubular and embracing the other of said conductors, and insulating thimbles connecting said conductors in predetermined spaced relation, each thimble comprising a cylindrical skirt, a central tubular portion and a plurality of ribs supporting said tubular portion at one end of said skirt, the cooperating skirt and ribs of adjacent thimbles defining a common spherical surface and being supported for engagement on said surface.

PAUL GOUDIME-LEVKOVITSCH.
STANLEY JAMES SMITH.

REFERENCES CITED

The following references are of record in the file of this patent:

UNITED STATES PATENTS

| Number | Name | Date |
|---|---|---|
| 793,647 | Fessenden | July 4, 1905 |
| 1,744,091 | Wrape | Jan. 21, 1930 |
| 1,891,080 | Danziger | Dec. 13, 1932 |
| 2,102,590 | Gray et al. | Dec. 21, 1937 |
| 2,199,446 | Ruben | May 7, 1940 |
| 2,217,162 | Ducati | Oct. 8, 1940 |
| 2,356,593 | Koeppe | Aug. 22, 1944 |
| 2,409,073 | Sias et al. | Oct. 8, 1946 |
| 2,428,898 | Waymouth | Oct. 14, 1947 |

FOREIGN PATENTS

| Number | Country | Date |
|---|---|---|
| 441,576 | Great Britain | Jan. 22, 1936 |
| 481,103 | Great Britain | Feb. 28, 1938 |